(12) United States Patent
Varley

(10) Patent No.: US 12,120,985 B2
(45) Date of Patent: Oct. 22, 2024

(54) BALER CONNECTABLE TO A TRACTOR AND METHOD

(71) Applicant: KVERNELAND GROUP RAVENNA S.R.L., Russi (IT)

(72) Inventor: Seamus Varley, Dublin (IE)

(73) Assignee: KVERNELAND GROUP RAVENNA S.R.L., Russi (IT)

( * ) Notice: Subject to any disclaimer, the term of this patent is extended or adjusted under 35 U.S.C. 154(b) by 574 days.

(21) Appl. No.: 17/611,159

(22) PCT Filed: May 27, 2020

(86) PCT No.: PCT/IB2020/055008
§ 371 (c)(1),
(2) Date: Nov. 14, 2021

(87) PCT Pub. No.: WO2020/240425
PCT Pub. Date: Dec. 3, 2020

(65) Prior Publication Data
US 2022/0217912 A1     Jul. 14, 2022

(30) Foreign Application Priority Data
May 30, 2019   (IT) .......................... 102019000007593

(51) Int. Cl.
*A01F 15/07*     (2006.01)

(52) U.S. Cl.
CPC ................ *A01F 15/0705* (2013.01)

(58) Field of Classification Search
CPC ............... A01F 15/0705; A01F 15/071; A01F 15/0883; A01F 15/0833; A01F 15/0715; A01F 15/12; A01F 15/106
See application file for complete search history.

(56) References Cited

U.S. PATENT DOCUMENTS 7,640,852 B1 * 1/2010 Anstey ................ A01F 15/0883
                                                                  100/88
9,232,696 B2 * 1/2016 Reijersen Van Buuren ................
                                                                  A01F 15/0883

FOREIGN PATENT DOCUMENTS

DE      26 34 638 A1    2/1978
DE      196 06 230 A1   8/1997
(Continued)

OTHER PUBLICATIONS

PCT International Search Report and Written Opinion from PCT International Application No. PCT/IB2020/055008, International Filing Date May 27, 2020 (12 pages).

*Primary Examiner* — Thomas B Will
*Assistant Examiner* — Robert E Pezzuto
(74) *Attorney, Agent, or Firm* — Wentsler LLC

(57) ABSTRACT

A baler connectable to a tractor for providing round bales, comprises: a baling chamber including a first part, and a second part; a pick-up device; a feeding system, including a feeding channel movable between a first configuration and a second configuration, wherein, in the first configuration of the feeding system, the feeding channel has a first orientation so that the outlet of the feeding channel is opened to the first part of the baling chamber, and, in the second configuration of the feeding system, the feeding channel has a second orientation, so that the outlet of the feeding channel is opened to the second part of the baling chamber, wherein the feeding system further includes a plurality of starter rollers, arranged at the outlet of the feeding channel.

20 Claims, 11 Drawing Sheets

(56) References Cited

FOREIGN PATENT DOCUMENTS

| | | |
|---|---|---|
| DE | 10 2005 020777 A1 | 11/2006 |
| EP | 0 064 117 B1 | 10/1984 |
| EP | 2 736 317 B1 | 10/2016 |
| GB | 2 137 926 A | 10/1984 |
| WO | 84/02253 A1 | 6/1984 |
| WO | 2013/157948 A1 | 10/2013 |

\* cited by examiner

BALER CONNECTABLE TO A TRACTOR AND METHOD

TECHNICAL FIELD

This invention relates to a baler connectable to a tractor for providing round bales and to a method for producing round bales in a baler connected to a tractor.

BACKGROUND ART

Balers are configured to produce a bale over a cycle including a first step of picking up crops from a field, feeding them to a baling chamber and rotating them in the baling chamber to form a bale, and a second step, of binding the formed bale with a fastening element (for instance, a net). Traditionally, during the first step the baler moves forward in the field, while during the second step the baler stops for a period of dozens of seconds, until the bale is bound and is therefore discharged from the baler. This stop implies wastes of time and additionally complicates the operations of driving the tractor. Continuous (or non-stop) balers have been developed in order to avoid the stop of the baler for binding the bale, thus saving time and simplifying the operations of driving the tractor to which the baler is connected.

For example, patent documents in the name of the patentee EP2736317B1, EP3005854A1, EP3005855B1, EP3058806B1, WO2014001330A3, WO2017017201A1 disclose continuous fixed round balers including a first (smaller) bale forming chamber and a second (bigger) bale forming chamber, wherein the dimension of the first baling chamber as well as the dimension of the second baling chamber is fixed (actually, each bale forming chamber includes a plurality of fixed rolls arranged all around the chamber).

Generally speaking, fixed balers have several drawbacks: the internal density of the formed bale is limited by the fact that at the beginning of the forming process, the crops are not compressed inside the chamber. Further, the final dimension of the bale is fixed, thus it is not adaptable according to user's desires.

Furthermore, patent document EP2196082B1 discloses a continuous round baler comprising a pressing chamber and a storage chamber, the storage chamber being arranged upstream of the pressing chamber and having a drivable floor conveyor comprising a plurality of conveying elements; the pressing chamber includes a plurality of pressing rolls having a fixed position around the chamber; the baler further includes a plurality of sensors configured to adjust he speed of one or more conveying elements responsive to an uneven filling of the pressing chamber. In this solution, a high degree of integration of sensors and electronics increases the final cost and reduces the reliability of the machine; moreover, the maximum bale density achievable is limited by the fact that the baling chamber has fixed dimension. Variable round balers have been developed in order to increase the flexibility of the machine and keep the bale compressed over all the duration of the bale's forming.

A continuous baler of variable chamber type is described in patent document WO2013157950A1; according to the solution of this document, the bale reaches its maximum size in a front chamber, afterwards the bale is moved along a substantially horizontal direction towards a back chamber for the binding net to be applied. A similar solution is provided by U.S. Pat. No. 4,009,559A. In these solutions, the horizontal moving of the bale to the back chamber requires high complexity of the transfer means, implying high power consumption and long overall baling cycle time. Moreover, the bale, while being transferred to the back chamber, has reached its maximum dimension but is not still bound with the net; hence, there is the concern to keep the bale under constant pressure to avoid an instantaneous growth.

Patent document DE102011109893A1 discloses a continuous agricultural round baler including a semi-variable pressing chamber (delimited by a belt and rollers) and a storage space where the crop is stored before being delivered to the pressing chambers. This baler has as a drawback a huge dimension (especially in a longitudinal direction) resulting in high costs. Another disadvantage is that the material pre-pressed in the storage space expands again after the transfer into the empty pressing chamber and desired bale densities are not achieved. Further, the crops need to travel for a long distance into the storage space (from a feeding rotor up to the pressing chamber), resulting in high energy consumption.

Another example of a continuous round baler is provided in patent document EP2220929A1, that discloses a baler configured to bind a formed bale in a rear area of the baler and, in the meantime, feeding the crops picked up from the field to a front area of the baler, until the formed bale is discharged; afterwards, the crops stored in the front area are transferred back to the rear area, and, in the meantime, the feeding mechanism is switched so that the crops picked up from the field are fed to the rear area. This solution has as a drawback the difficulty of filling and emptying the storage means; in fact, the crops that are fed to the storage means tend to form an agglomerate that is difficult to release and feed to the rear area. Also, the bale formation is not uniform, because in a first step two flows of crops are fed to the bale (one from the pick-up device and one from the storage means), and in a second step a single flow of crop (from the pick-up device) is fed to the bale.

Hence, there is a need for a continuous baler in which the supply of crops to the bale is uniform and, at the same time, an instantaneous growth of the bale before binding is applied is prevented.

An additional issue in variable balers is the positioning of the binding device: while in fixed or in semi-variable balers it is sufficient to insert the binding material between two of the fixed rollers of the baling chamber (like in the fixed baler of the above-mentioned document EP300854A1 or in the semi-variable baler of the above-mentioned document DE102011109893A1), in variable balers it is difficult to find a room for feeding the binding material towards the bale.

Another issue in variable and semi-variable balers is that the belt requires a quite complex design in order to create a passage through which the bale can be discharged. In the above-mentioned document DE102011109893A1, the whole belt is lifted in order to discharge the bale; this mechanism requires high strengths to lift the whole belt resulting in high complexity of the machine.

Patent document JP2001008525A discloses a round baler including two baling chambers, wherein the crops are fed to the first baling chamber and then the forming bale is transferred to the second baling chamber. The two baling chambers are delimited by two belts. However, the presence of two belts makes the compressing of the bale less effective and the machine control more complex.

Other examples of continuous round balers are provided in the following patent documents: DE3415310A1, EP0115608A1, DE102005020777A1, WO9908505A1, EP2196082B1.

DISCLOSURE OF THE INVENTION

Scope of the present invention is to provide a baler and a method for producing round bales that overcomes at least one of the aforementioned drawbacks.

This scope is achieved by the baler and the method for producing round bales in a baler according to the appended claims.

For example, the baler is connected (or connectable) to a tractor. Alternatively, the baler could be self-propelled (i.e. equipped with its own engine, connected to driving wheels); in this case, the baler could be equipped with a seat for a driver, or it could be self-propelled (equipped with a system of autonomous driving); for example, baler could be configured according to patent application PCT/IB2020/054872, incorporated herein by reference with regard to the features pertaining self-propelled and autonomous drive features.

The method includes a step of picking-up crops from a field, through a pick-up device. The picking-up step is performed while the tractor advances through the field.

The method comprises a step of forming a bale in the baling chamber, by rotating the crops received in the baling chamber through a conveying assembly.

In an embodiment, the method comprises a step of start a formation of a bale in a first part of the baling chamber. Said step of starting the formation of the bale is performed by advancing the crops along a feeding channel from an inlet of the feeding channel facing the pick-up device to an outlet of the feeding channel. In said step of starting the formation of the bale, the feeding channel has a first orientation so that the outlet of the feeding channel is opened to the first part of the baling chamber. Also, said step of starting the formation of the bale is performed by rotating the crops received in the first part of the baling chamber through a conveying assembly. In an embodiment, the conveying assembly includes a belt. Preferably, the rotating of the crops is also performed through a plurality of starter rollers, arranged at the outlet of the feeding channel.

The method comprises a step of binding and discharging a former bale, housed in a second part of the baling chamber. The former bale has been already formed at this stage. Said binding and discharging of the former bale is performed during the starting (partial) formation of the bale in the first part of the baling chamber.

The method comprises, after the former bale has been discharged from the second part of the baling chamber, a step of transferring the bale (partially formed in the first part) from the first part to the second part of the baling chamber. During the transferring of the bale from the first part to the second part of the baling chamber, the feeding channel moves until the feeding channel has a second orientation (different from the first orientation) in which the outlet is opened to the second part of the baling chamber. Also, the starter rollers move in synchronized fashion with the feeding channel.

Hence, the method includes a step of transferring baling chamber components simultaneously with the transfer of the bale, for continuing to form the bale in a different location, in particular, the method includes a step of transferring the starter rollers from the first position to the second position. Also, the method includes a step of transferring the feeding channel from the first orientation to the second orientation, simultaneously with the transferring of the bale and/or with the transferring of the baling chamber components (e.g. starter rollers). Also, the method includes a step of changing the shape of the belt to continue to form the bale in the second part of the baling chamber.

Preferably, the outlet of the feeding channel and the starter rollers move along a substantially circular trajectory. The bale itself, during transferring, follows a substantially circular trajectory; in particular, the bale follows a substantially circular trajectory from a higher position to a lower position; in an embodiment, said substantially circular direction is defined about an axis passing through a pushing rotor configured to push the crops along the feeding channel. Hence, the bale travels along an arc of circumference.

The method comprises a step of completing the formation of the bale in the second part of the baling chamber (after it has been transferred from the first part to the second part). The step of completing the formation of the bale is performed by advancing the crops along the feeding channel, from the inlet to the outlet, and by rotating the crops received in the second part of the baling chamber through the conveying assembly. During the step of completing the formation of the bale the feeding channel has its second orientation, so that the outlet is opened to the second part of the baling chamber. Preferably, the rotating of the bale is also performed through the plurality of starter rollers, arranged at the outlet of the feeding channel.

Hence, the bale formation is performed firstly in the first part of the baling chamber, then during the transferring from the first part to the second part, then it is completed in the second part. This solution provides a non-stop bale which allows to form a uniform bale, by constantly feeding the crops during the formation of the bale and, also to prevent instantaneous expansions of the bale and to ease the transferring.

Preferably, during the transferring of the bale from the first part to the second part of the baling chamber, the outlet of the channel and the starter rollers keep in contact with the bale. Also, the starter rollers continuously cooperate with the conveying assembly to rotate the bale during the transferring.

Hence, the bale constantly rotates during transferring.

Preferably, during the transferring of the bale from the first part to the second part of the baling chamber, the feeding channel continuously feeds the crops to the bale while the conveying assembly transfers the bale from the first part to the second part. Hence, the bale constantly grows during the transferring.

In an embodiment, the method comprises a step of binding the bale with a fastening element.

In an embodiment, after the bale is completely formed in the second part of the baling chamber, the feeding channel is moved back to its first orientation to start to form a new bale in the first part of the baling chamber. While the new bale starts to be formed in the first part, the formed bale housed in the second part of the baling chamber is bound with a fastening element. Then, while the new bale continues to grow in the first part, the formed bale is discharged, hence clearing the second part. Once the second part has been cleared by discharging the formed bale, the new bale is transferred from the first part to the second part, and so on. Also, together with the transferring of the bale, the feeding channel is moved from its first orientation to its second orientation, the starter rollers are moved from their first position to their second position, and the belt is manipulated to change its shape for continuing to form the bale in said second part of the baling chamber.

Hence, the method provides a non-stop baling process characterized by a good uniformity of crops distribution and a good average pressure in the formed bale. Also, the transferring of the bale is particularly easy.

In an embodiment, in the step of binding, the binder guides the fastening element into the baling chamber along an upwardly trajectory from a first height to a second height, wherein the first height is lower than the second height with respect to a ground surface on which the baler rests. Preferably, the upwardly trajectory is substantially vertical (parallel and directed opposite to the weight force).

In an embodiment, the binder is attached to the frame of the baler. In an embodiment, the binder is attached to the wheel axle.

This positioning of the binder makes the access to the fastening element reservoir roll more comfortable; in fact, the user may easily slide out a finished roll and slide in a new roll, without any need for raising heavy rolls. Also, thanks to the positioning of the binder under de baler, it is possible to feed the fastening element to the bale through a passage defined between a starter roller and a portion of the frame, avoiding to interrupt the belt elsewhere.

In an embodiment, the binder includes a binding structure. The binding structure is tube-shaped. The binding structure includes a cylindrical wall. The binding structure encloses a fastening element reservoir. The binding structure has an aperture for releasing the fastening element; the aperture is realized in the cylindrical wall, elongated along an axis of the cylindrical wall.

In an embodiment, the binding step includes a rotation of the binding structure about a rotation axis, from a rest position to a working position.

In an embodiment, the binding step includes an advancement of the duckbill towards the baling chamber. Said rotation of the binding structure is synchronized with said advancement of the duckbill.

In an embodiment, the binding step includes a rotation of a linkage bar about a pivoting axis, to move the duckbill along a predetermined path, towards the baling chamber. In an embodiment, the linkage bar rotates in synchronized fashion with the rotation of the binding structure.

In an embodiment, the advancement of the duckbill is performed by said rotation of a linkage bar about the pivoting axis. Preferably, the linkage bar has a first end, defining the pivoting axis, and a second end, supporting the duckbill. Preferably, the pivoting axis is spaced apart from the binding structure.

In an embodiment, the binder includes a knife attached to the binding structure. In an embodiment, the knife is oriented tangentially with respect to the cylindric wall of the binding structure. Upon rotating the binding structure from the working position to the rest position, the knife intercepts the fastening element, to cut the fastening element.

In an embodiment, the binding step includes, after cutting the fastening element, a return step, including a rotation of the binding structure from the working position to the rest position.

In an embodiment, in the binding step the binding structure rotates in a positive rotation direction, and in the return step the binding structure rotates in a negative rotation direction, opposite to the positive rotation direction.

In an embodiment, from a point of view on a left-hand side of the baler (with the tongue connectable to the tractor on the left and the tailgate on the right), the positive rotation direction is anticlockwise and the negative rotation direction is clockwise.

In an embodiment, the rotation of the linkage bar about the pivoting axis is synchronized with a rotation of the binding structure about the rotation axis.

In an embodiment, an actuator performs both said pivoting of the linkage bar and said rotation of the binding structure. In an embodiment, the actuator performs the pivoting of the linkage bar, and the pivoting of the linkage bar drags the rotation of the binding structure.

The present description also regards a baler. The baler is connectable to a tractor. The baler is configured for providing round bales.

The baler comprises a frame. The frame is supported on a wheel axle.

The frame (or the baler) includes a baling chamber, configured for receiving crops for forming a bale. The baling chamber includes a first part, for housing a first amount of crops, and a second part, for (simultaneously) housing a second amount of crops. The term "amount of crops" means, within the present description, a partially formed bale (during its formation process), or a formed bale (after its formation process). In an embodiment, the first part is configured for starting a formation of the bale, the second part is configured for complete the formation of the bale.

In another embodiment, the baling chamber includes a single chamber, for receiving the crops and forming the bale.

The baler comprises a conveying assembly. The conveying assembly is configured for imparting a first rotating movement to the first amount of crops, and, at the same time, a second rotating movement to the second amount of crops.

The baler comprises a pick-up device. The pick-up device is configured for picking-up the crops from a field.

The baler comprises a feeding system. The feeding system is configured to feed the crops from the pick-up device to the baling chamber.

The feeding system includes a feeding channel. The feeding channel is traversed by the crops being fed to the baling chamber. The feeding channel has an inlet, for receiving the crops from the pick-up device, and an outlet, opened to the baling chamber for feeding the crops to the baling chamber.

The feeding system is movable (or switchable) between a first configuration and a second configuration. In the first configuration of the feeding system, the feeding channel has a first orientation. The feeding channel, in its first orientation, has the outlet opened to the first part of the baling chamber. In the second configuration of the feeding system, the feeding channel has a second orientation. The second orientation is different from the first orientation. The feeding channel, in its second orientation, has the outlet opened to the second part of the baling chamber. In both the first orientation and the second orientation, the inlet of the feeding channel faces the pick-up device.

The feeding channel is configured to selectively feed the crops to the first part of the baling chamber or to the second part of the baling chamber.

Hence, the feeding system in its first configuration is configured to feed the crops picked up by the pick-up device to the first part of the baling chamber; the feeding system in its second configuration is configured to feed the crops picked up by the pick-up device to the second part of the baling chamber.

In an embodiment, the feeding system further includes a plurality of starter rollers. The starter rollers of said plurality are arranged at the outlet of the feeding channel. Preferably, a first part of said plurality of starter rollers is arranged at a lower side of the outlet of the feeding channel, and a second part of said plurality of starter rollers is arranged at an upper side of the outlet of the feeding channel. The starter rollers of said plurality are configured to cooperate with the conveying assembly to impart the rotating movement to the crops. Specifically, when the feeding system is in its first configuration, the starter rollers cooperate with the conveying assembly to impart the first rotating movement to the first amount of crops, and, when the feeding system is in its second configuration, the starter rollers cooperate with the conveying assembly to impart the second rotating movement to the second amount of crops.

In an embodiment, the starter rollers of said plurality are configured to cooperate with the feeding channel to feed the crops into the baling chamber. Specifically, when the feeding system is in its first configuration, the starter rollers are configured to cooperate with the feeding channel to feed the crops to the first part of the baling chamber; when the feeding system is in its second configuration, the starter rollers are configured to cooperate with the feeding channel to feed the crops to the second part of the baling chamber.

In an embodiment, the starter rollers of said plurality being movable in synchronized fashion with the feeding channel between a first position and a second position. In the first position, the starter rollers (at least partially) delimit the first part of the baling chamber to rotate the first amount of crops. In the second position, the starter rollers (at least partially) delimit the second part of the baling chamber to rotate the second amount of crops. In the first configuration of the feeding system, the starter rollers of said plurality are in the first position. In the second configuration of the feeding system, the starter rollers of said plurality are in the second position.

So, when the bale (or amount of crops) has reached a certain dimension in the first part and is moved to the second part, the feeding channel is moved in the second position in order to keep feeding the crops to the bale. This allows to never stop the advancing of the crops through the feeding channel, during the formation of the bale.

In an embodiment, the outlet of the feeding channel defines in the baling chamber an opening through which the crops are fed to the baling chamber. The starter rollers of said plurality delimit said opening. The opening is movable in synchronized fashion with the feeding channel and with the starter rollers, so that, in the first configuration of the feeding channel, the opening is defined in the first part of the baling chamber and, in the second configuration of the feeding channel, the opening is defined in the second part of the baling chamber.

The conveying assembly is configured to transfer the first amount of crops from the first part of the baling chamber to the second part of the baling chamber. The conveying assembly is configured to move in synchronized fashion with the feeding system to transfer the first amount of crops from the first part to the second part simultaneously with the movement of the feeding channel from the first orientation to the second orientation.

The plurality of starter rollers is configured to keep in contact with the first amount of crops while the conveying assembly transfers the first amount of crops from the first part of the baling chamber to the second part of the baling chamber.

The feeding channel is configured to continuously feed the crops to the baling chamber (to grow the first amount of crops being transferred) while the conveying assembly transfers the first amount of crops from the first part of the baling chamber to the second part of the baling chamber.

In an embodiment, the conveying assembly includes a belt. Hence, in an embodiment, the baler is a variable-chamber baler. In an embodiment, the conveying assembly includes a single belt. In an embodiment, the conveying assembly includes two or more belts.

In an embodiment, the belt partially delimits the baling chamber. In an embodiment, the belt partially delimits both the first part and the second part of the baling chamber. The belt is configured to impart the first rotating movement to the first amount of crops housed in the first part and a second rotating movement to the second amount of crops.

In an embodiment, the conveying assembly includes a plurality of belt rollers, supporting and rotating the belt.

In an embodiment, in the first configuration of the feeding system, the starter rollers cooperate with the belt to delimit the first part of the baling chamber, and, in the second configuration of the feeding system, the starter rollers cooperate with the belt to delimit the second part of the baling chamber.

In an embodiment, the conveying assembly includes one or more arms. Said one or more arms are configured to move the belt rollers (or a group thereof). At least some belt rollers of said plurality of belt rollers are movable, in synchronized fashion with the feeding system, through said one or more arms, to move the belt.

In an embodiment, the conveying assembly (or said one or more arms) includes a guide arm. The plurality of belt rollers includes a guide arm roller mounted on the guide arm (at an extremity thereof). The guide arm is movable between a raised position, in which the guide arm roller is spaced apart from the belt, and a lowered position, in which the guide arm roller contacts the belt. When the feeding system is in the first configuration, the guide arm is in the lowered position (to keep the belt stretched on the first part of the baling chamber). When the feeding system is in the second configuration, the guide arm is in the raised position. Specifically, when the feeding system starts to switch from the first configuration to the second configuration, the guide arm raises up to let the bale moving to the second part.

In an embodiment, the conveying assembly (or said one or more arms) includes a rotating arm. The plurality of belt rollers includes a rotating arm roller, mounted on the rotating arm (at an extremity thereof). The rotating arm is rotatable about a respective axis between a rest position in which the rotating arm roller is spaced apart from the belt, and a working position in which the rotating arm roller contacts the belt. When the feeding system is in the first configuration, the rotating arm is in the rest position. Also, when the feeding system is in the second configuration, the rotating arm is in the rest position. During the moving of the feeding system from the first configuration to the second configuration (hence, during the transferring of the bale or amount of crops), the rotating arm is in the working position, in order to control and guide the belt close to the bale's circumference during the transfer of the bale or amount of crops (in order to keep the bale compressed).

In another embodiment, the conveying assembly includes a plurality of fixed rollers, configured to rotate the crops. In particular, in this embodiment, a first group of the fixed rollers partially delimits the first part of the baling chamber and a second group of the fixed rollers partially delimits the second part of the baling chamber. Hence, in an embodiment, the baler is a fixed-chamber baler.

Preferably, the second part of the baling chamber is provided in a rear area of the baling chamber; the first part of the baling chamber is provided in a front area of the baling chamber. The front area is interposed between the tractor and the rear area.

In an embodiment, the feeding system includes a starter rollers structure supporting the starter rollers. The starter rollers are rotatably mounted on the starter rollers structure. The starter rollers structure is rotatable about a respective rotation axis to move the starter rollers between the first position and the second position. So, the starter rollers are movable along a circular trajectory.

When the feeding system moves from the first configuration to the second configuration, the starter roller structure rotates in a clockwise direction (defined by seeing the baler in a lateral view with the tractor on the left). Hence, the feeding channel rotates in the clockwise direction, from its first orientation to its second orientation. Similarly, the partially formed bale rotates in the clockwise direction.

When the feeding system moves from the second configuration to the first configuration, the starter roller structure rotates in an anticlockwise direction (defined by seeing the baler in a lateral view with the tractor on the left).

In an embodiment, the feeding system includes a pushing rotor. The pushing rotor is configured to advance the crops along the feeding channel (towards the outlet). The pushing rotor is rotatable about a respective rotation axis to advance the crops. In an embodiment, the rotation axis of the starter rollers structure is superposed (hence, coincides) with the rotation axis of the pushing rotor. However, while the pushing rotor continuously rotates to advance the crops, the starter roller structure only rotates to switch the feeding system from the first configuration to the second configuration, and vice versa.

In an embodiment, the feeding system includes a rotatable wall. Preferably, the rotatable wall is arranged at a lower side of the feeding channel. The rotatable wall is rotatable to move between a rest position and a working position. Preferably, the rotatable wall is rotatable about a rotation axis parallel to a direction of development of the starter rollers. In the rest position, the rotatable wall extends out of the feeding channel (being in its second position). In the working position, the rotatable wall is elongated along the feeding channel to partially delimit the feeding channel (being in its first position). In particular, the rotatable wall in the working position defines a lower portion of the feeding channel. This rotatable wall allows the feeding channel to vary its length, accordingly to the configuration: in the first configuration of the feeding system, the channel has a greater length, and, in the second configuration of the feeding system, the channel has a smaller length.

In an embodiment, the baler comprises a binding unit, configured to bind the bale with a fastening element. In an embodiment, the binding unit is configured to feed the fastening element to the second part of the baling chamber. So, while a formed bale is in the second part for being bind, a new bale may start its formation in the first part.

In an embodiment, the baler comprises a bottom roller. In an embodiment, the bottom roller is fixed to the frame.

In an embodiment, the binding unit is configured to feed the fastening element to the second part of the baling chamber through a passage defined between a starter roller of said plurality of starter rollers and the bottom roller.

In an embodiment, the binder is located at a lower height than the baling chamber, with respect to a ground surface on which the baler rests, and is configured for guiding the fastening element into the baling chamber along an upwardly trajectory.

In an embodiment (wherein the baling chamber includes a first part and a second part) the binder is located below the second part, preferably the binder is interposed between the second part and the ground surface.

In an embodiment, the binder is located between the feeding system and the wheel axle, along a horizontal direction parallel to the ground surface.

In an embodiment, the binder includes a binding structure. The binding structure is tube-shaped. The binding structure encloses a fastening element reservoir and has an aperture for releasing the fastening element. The aperture is elongated along the direction of development of the tube-shaped binding structure.

In an embodiment, the binder includes a duckbill. The duckbill is configured to pull the fastening element out of the aperture and guide it to the baling chamber.

In an embodiment, the binding structure is rotatable, about a rotation axis, between a rest position and a working position. In the rest position of the binding structure, the aperture is in a first position and, in the working position of the binding structure, the aperture is in a second position for feeding the fastening element to the baling chamber.

In an embodiment, the binder includes a knife. The knife is attached to the binding structure and is configured to intercept and cut the fastening element upon rotating the binding structure from the working position to the rest position.

In an embodiment, the binder includes a linkage bar. Preferably, the binder includes a pair of linkage bars, at opposite ends of the tube-shaped binding structure. The linkage bar is pivotable (or rotatable) about a pivoting axis to move the duckbill along a predetermined path towards the baling chamber. Preferably, the linkage bar is pivotable in synchronized fashion with the binding structure.

Preferably, the linkage bar is arc shaped between a first end and a second end. The pivoting axis is located at the first end. The duckbill is attached to the second end.

In an embodiment, the binder is driven by an actuator, configured to simultaneously actuate both a pivoting of the linkage bar about the pivoting axis and a rotation of the binding structure between the rest position and the working position.

In an embodiment, the actuator is configured to performs a pivoting of the linkage bar. The linkage bar pivoting is connected to the binding structure so that the linkage bar pivoting drags a rotation of the binding structure. In an embodiment, the connection between the linkage bar and the binding structure may be provided by the fastening element itself, which is enclosed into the binding structure and has a free end attached to the duckbill. In another embodiment, the linkage bar may be connected to the binding structure through a connector.

BRIEF DESCRIPTION OF DRAWINGS

This and other features of the invention will become more apparent from the following detailed description of a preferred, non-limiting example embodiment of it, with reference to the accompanying drawings, in which.

DETAILED DESCRIPTION OF PREFERRED EMBODIMENTS OF THE INVENTION

Figure 1:
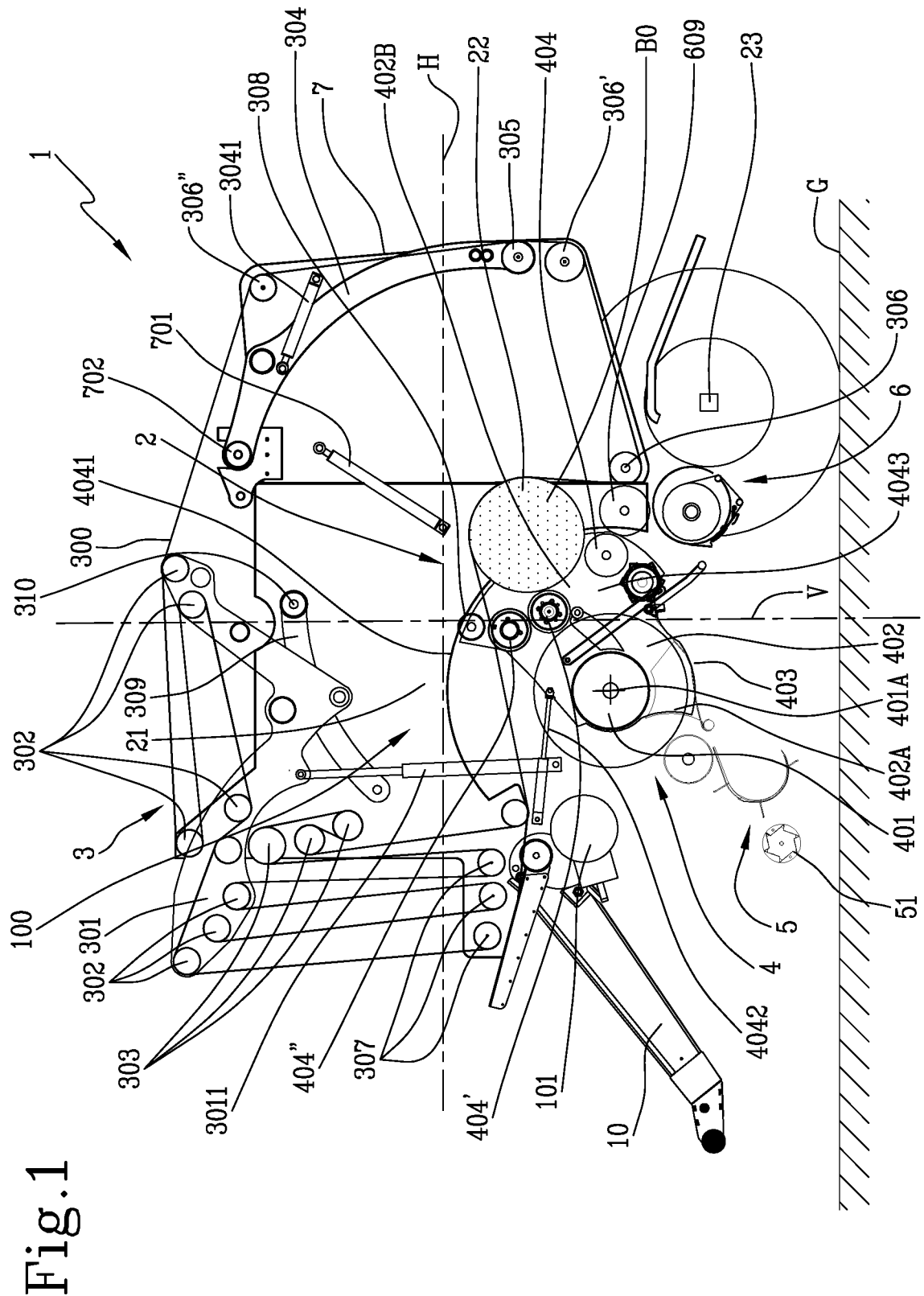
FIG. 1 illustrates a baler according to the present description, while starting to form a former bale in a second part of the baling chamber, by a feeding system being in a second configuration.

With reference to the accompanying drawings, the numeral 1 denotes a baler, according to the present disclosure.

The baler 1 includes a tongue 10 connectable to a tractor. The tongue 10 is configured to allow the tractor to tow the baler 1.

The baler 1 comprises a drive shaft. The drive shaft, in an embodiment, is a cardan shaft. The baler 1 includes a gearbox 101. The drive shaft is configured to transmit mechanical rotation from a motor of the tractor to the baler 1, through the gearbox 101.

The baler 1 comprises a frame 100 including a baling chamber 2. The frame 100 surrounds the baling chamber 2. The baling chamber includes a first part 21 and a second part 22. The baling chamber 2 is configured for receiving crops to form a bale B.

The baler 1 comprises a wheel axle 23; the frame 100 is supported on the wheel axle 23.

The baler 1 comprises a conveying assembly 3. The conveying assembly 3 includes a belt 300.

The conveying assembly 3 includes a tensioner 301 and a plurality of tensioner rollers 302 mounted on the tensioner 301. The tensioner rollers 302 are configured to support the belt 300. The belt 300 is wrapped around the tensioner rollers 302. In an embodiment, the tensioner rollers 302 are idle. Hence, the movement of belt 300 makes the tensioner rollers 302 rotate. The conveying assembly 3 includes a tensioner actuator 3011. In an embodiment, the tensioner actuator 3011 is a cylinder-piston actuator. The tensioner actuator 3011 has a first end (pivotably) connected to the frame 100 and a second end (pivotably) connected to the tensioner 301. Hence, the tensioner 301, actuated by the tensioner actuator 3011, is configured to manipulate the belt 300.

The conveying assembly 3 includes a plurality of driven rollers 303. In an embodiment, the driven rollers 303 are mounted on the frame 100. The belt 300 is wrapped around said driven rollers 303. The driven rollers 303 transmit mechanical movement to the belt 300.

The baler 1 comprises a tailgate 7. The tailgate 7 is connected to the frame 100. The tailgate 7 is movable between a closed position and an open position. The tailgate 7 in the open position is configured for discharging a formed and bound bale.

The baler 1 comprises a tailgate actuator 701. The tailgate actuator 701 in an embodiment is a cylinder-piston actuator. The tailgate actuator 701 has a first end connected to the frame 100 and a second end connected to the tailgate 7. The tailgate actuator 701 is configured to move the tailgate 7 between the closed position and the open position.

The conveying assembly 3 includes a rotating arm 304. The rotating arm 304 is rotatable about a pivot 702. In an embodiment, said pivot 702 is provided on the tailgate 7; said pivot 702 is movable integrally with the tailgate 7. The conveying assembly 3 includes a rotating arm actuator 3041. The rotating arm actuator 3041, in an embodiment, is a cylinder-piston actuator. The rotating arm actuator 3041 has a first end (pivotably) connected to the tailgate 7 and a second end (pivotably) connected to the rotating arm 304. The rotating arm is rotatable about the pivot 702 between a rest position and a working position. The rotating arm actuator 3041 is configured to move the rotating arm 304 between the rest position and the working position. The conveying assembly 3 includes a rotating arm roller 305. The rotating arm roller 305 is mounted on the rotating arm 304, preferably at an extremity thereof. In an embodiment, the rotating arm roller 305 is idle. When the rotating arm 304 is in the rest position, the rotating arm roller 305 is positioned along a back wall of the tailgate 7 and does not interfere with the belt 300; when the rotating arm 304 is in the working position, the rotating arm roller 305 contacts and stretches the belt 300.

The conveying assembly 3 includes a plurality of tailgate rollers 306, 306', 306", connected to (or mounted on) the tailgate 7. Said tailgate rollers 306, 306', 306" are idle. The belt 300 is wrapped around said tailgate rollers 306, 306', 306" and is stretched by them.

The conveying assembly 3 includes a guide arm 309. The conveying assembly 3 includes a guide arm roller 310. The guide arm roller 310 is connected to the guide arm 309, preferably at an extremity thereof. The guide arm 309 is movable between a raised position, in which the guide arm roller 310 is spaced apart from the belt 300, and a lowered position, in which the guide arm roller 310 contacts the belt 300 (to stretch it).

The conveying assembly 3 includes a plurality of frame 100 rollers 307 connected to the frame 100 and configured to stretch and manipulate the belt 300.

The conveying assembly 3 includes a further roller 308 configured to stretch and manipulate the belt 300.

Said tensioner rollers 302, driven rollers 303, rotating arm roller 305, tailgate rollers 306, 306', 306", guide arm roller 310, roller 308 attached to the feeding structure form a plurality of belt rollers, configured to support, stretch and manipulate the belt 300.

The baler 1 comprises a pick-up device 5. The pick-up device is configured for picking up the crops from a field. The pick-up device 5 includes a pick-up roll 51.

The baler 1 comprises a feeding system 4. The feeding system 4 is configured to guide the crops from the pick-up device 5 to the baling chamber 2. The feeding system 4 includes a pushing rotor 401, rotatable about a rotation axis 401A. The feeding system 4 includes a feeding channel 402. The feeding channel 402 extends between an inlet 402A and an outlet 402B. The inlet 402A faces the pick-up device 5. The outlet 402B defines an opening in the baling chamber 2. The pushing rotor 401 is positioned along the feeding channel 402, downstream of the inlet 402A and upstream of the outlet 402B. The inlet 402A is at a lower level with respect to the outlet 402B; the pushing rotor 401, by rotating about its axis 401A, pushes the crops up from the inlet 402A to the outlet 402B.

The feeding system 4 includes a drop floor device 403, defining a (portion of) bottom side of the feeding channel 402. The drop floor device 403 is positioned between the inlet 402A and the outlet 402B of the feeding channel 402. The pushing rotor 401 is positioned above said drop floor device 403.

The feeding system 4 includes a plurality of starter rollers 404, 404', 404". The starter rollers 404, 404', 404" are driven rollers. Said plurality of starter rollers includes at least a starter roller 404 positioned at a bottom side of the feeding channel 402 and at least a starter roller 404', 404" positioned at a top side of the feeding channel 402.

In an embodiment, a (or at least one) starter roller 404" of said plurality is configured to rotate the bale B when the feeding system 4 is in its second configuration and to drive the belt 300 when the feeding system 4 is in its first configuration.

The plurality of starter rollers 404, 404', 404" is mounted on a starter roller structure 4043. The starter roller structure 4043 is rotatable about an axis which preferably coincides with the axis 401A of rotation of the pushing rotor 401.

The frame 100 defines a starter roller guide 4041 along which a periphery of the starter roller structure 4043 moves.

The feeding system 4 includes a starter roller actuator 4042 configured to actuate the rotation of the starter roller structure 4043. In an embodiment, the starter roller actuator 4042 is a cylinder piston actuator; the starter roller actuator 4042 has a first end (pivotably) connected to the frame 100 and a second end (pivotably) connected to the starter roller structure 4043.

The roller 308 configured to manipulate the belt is mounted (attached) to the starter roller actuator 4042.

The feeding system 4 includes a rotatable wall 405. The rotatable wall 405 is rotatable about a respective axis between a working position, in which it defines a portion of the bottom side of the feeding channel 402, and a rest position, in which it is spaced apart from the feeding channel 402.

The feeding system 4 is movable between a first configuration and a second configuration.

In the first configuration of the feeding system 4, the feeding channel 402 has a first orientation, so that the outlet 402B is opened towards the first part 21 of the baling chamber 2.

In the first configuration of the feeding system 4, the starter rollers 404, 404', 404" delimit the first part 21 of the baling chamber 2, to rotate crops housed therein.

In the second configuration of the feeding system 4, the feeding channel 402 has a second orientation, so that the outlet 402B is opened towards the second part 22 of the baling chamber 2.

In the second configuration of the feeding system 4, the starter rollers 404, 404', 404" delimit the second part 22 of the baling chamber 2, to rotate crops housed therein.

The feeding system 4 is movable from the first configuration to the second configuration (and vice versa) upon rotation of the starter roller structure 4043 about its rotation axis and, preferably, upon rotation of the rotatable wall 405 from its working position to its rest position (and vice versa).

Figure 2:
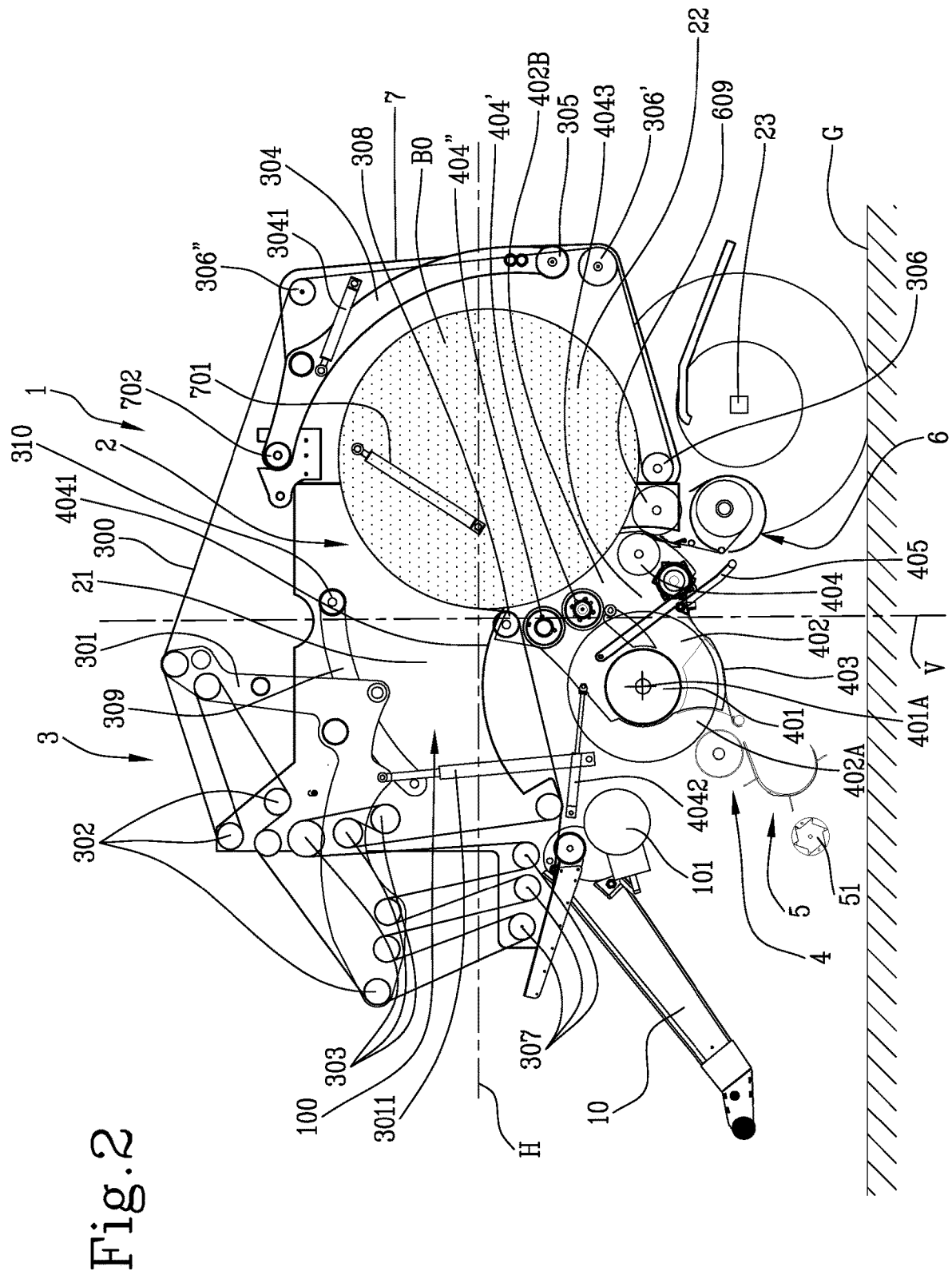
FIG. 2 illustrates the baler of FIG. 1, while starting to bind the former bale housed in the second part of the baling chamber, the feeding system still being in the second configuration.
Figure 3:
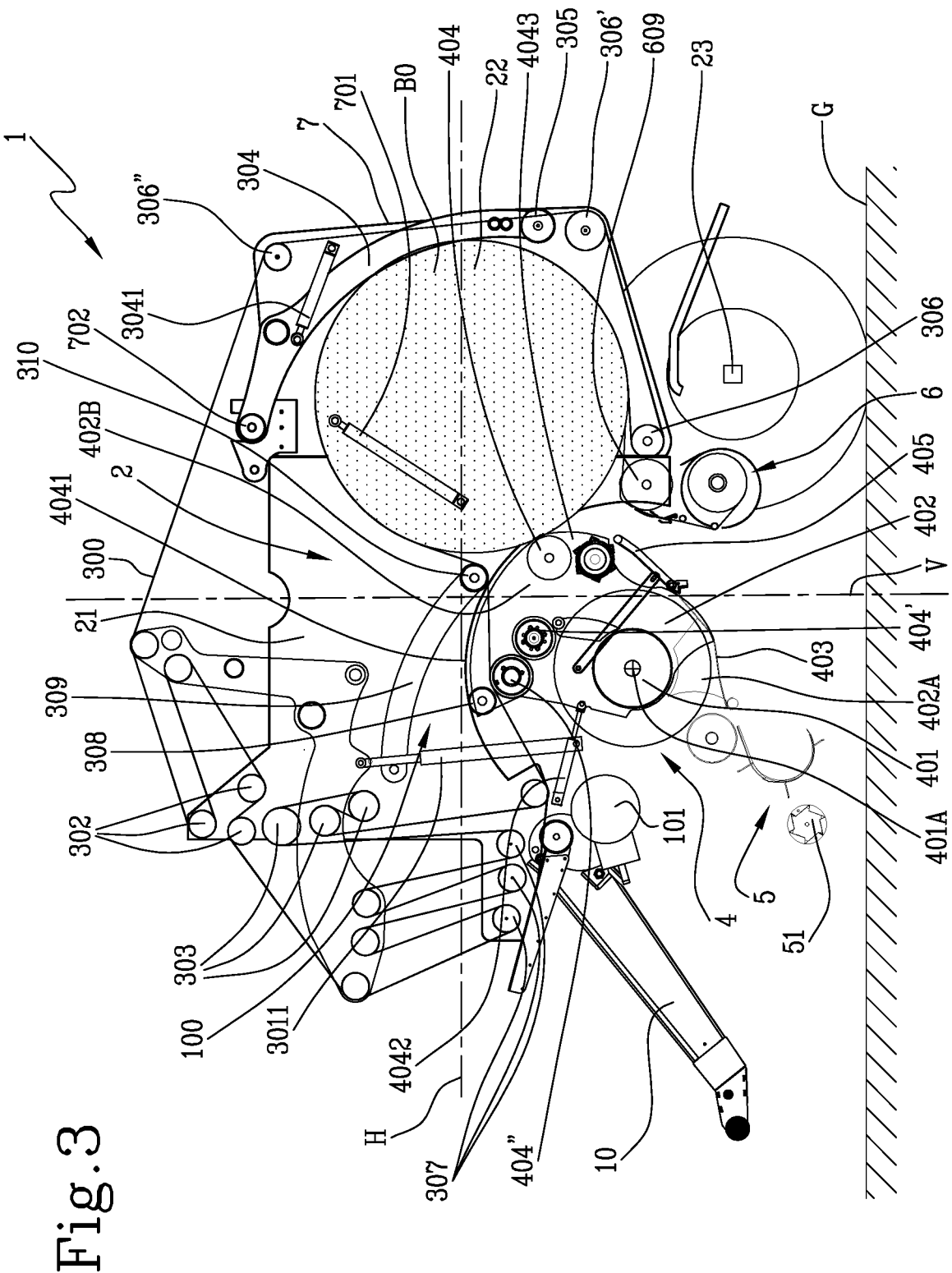
FIG. 3 illustrates the baler of FIG. 1, while binding the former bale housed in the second part of the baling chamber and moving the feeding system from the second configuration to the first configuration.
Figure 4:
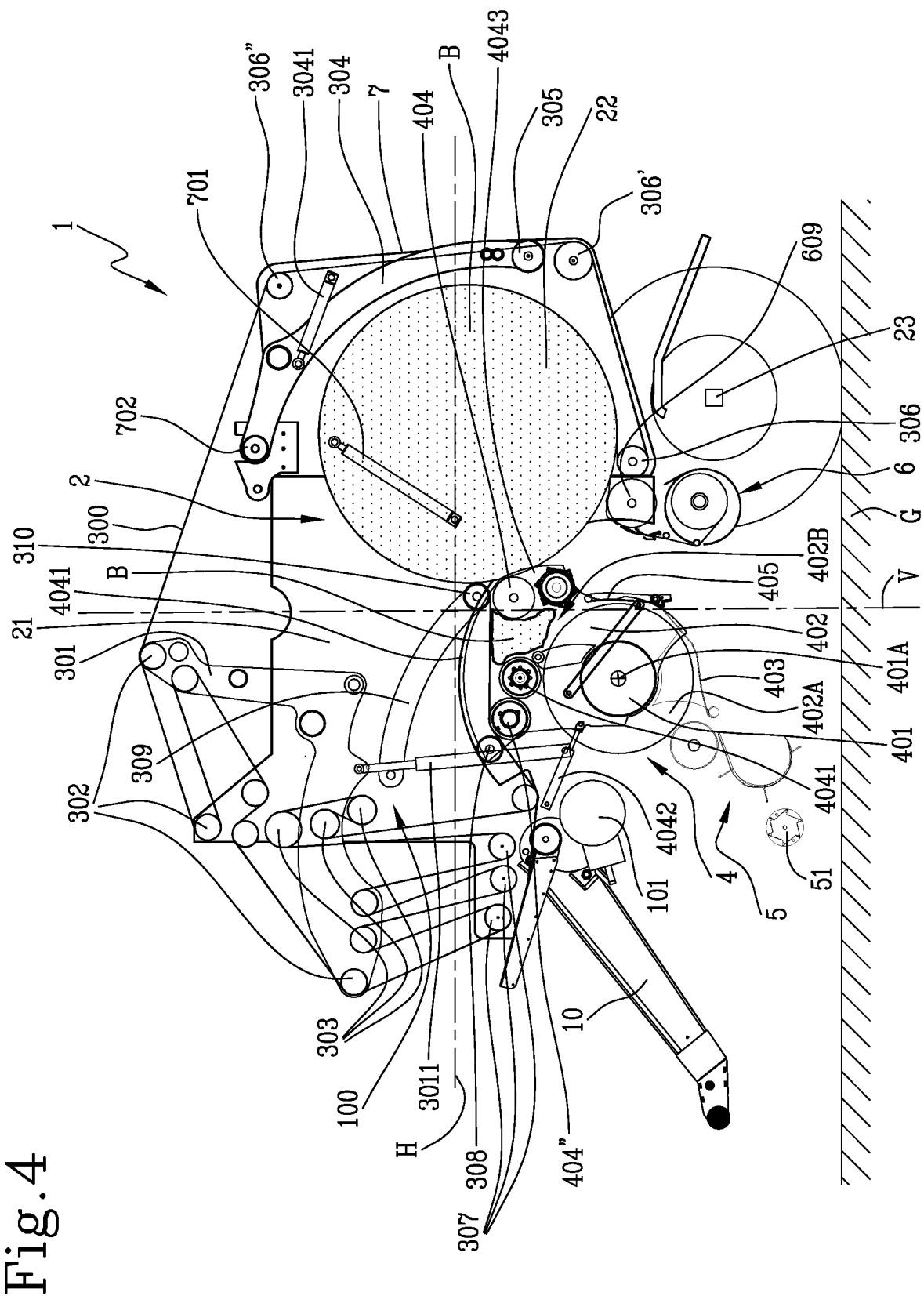
FIGS. 4, 5 and 6 illustrate the baler of FIG. 1, while starting to form a bale in the first part of the baling chamber, by the feeding system being in the first configuration.
Figure 5:
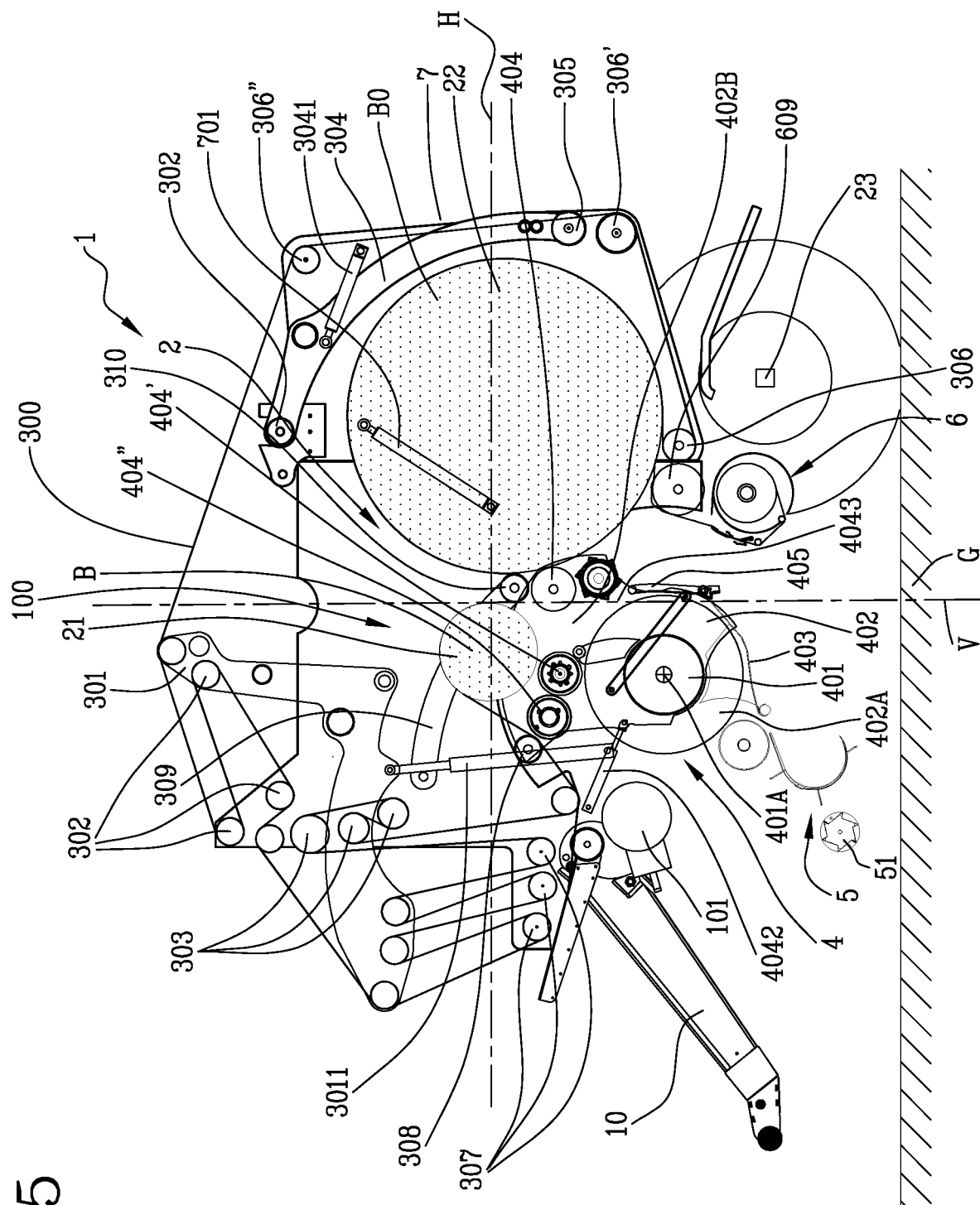
Figure 6:
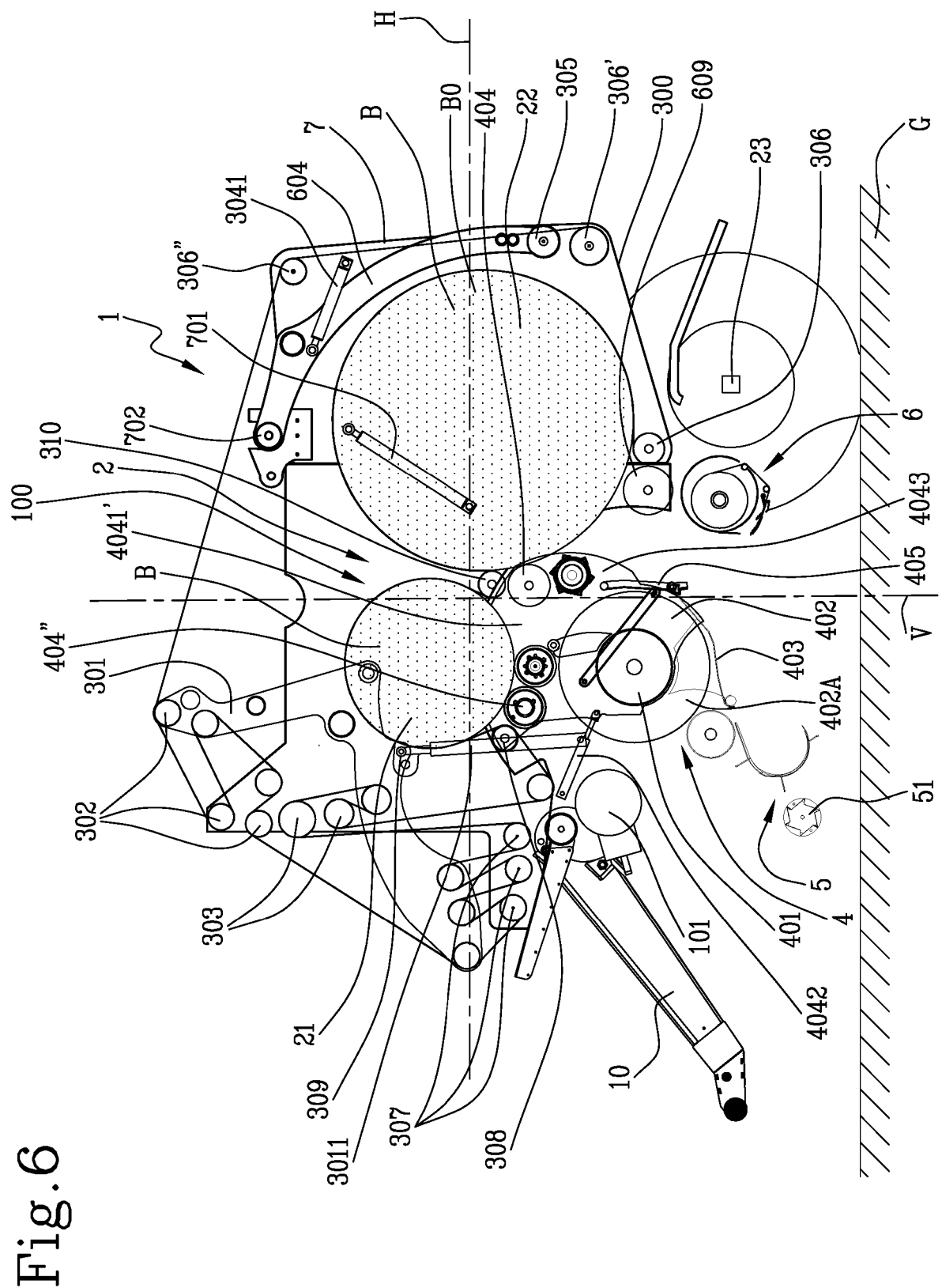
Figure 7:
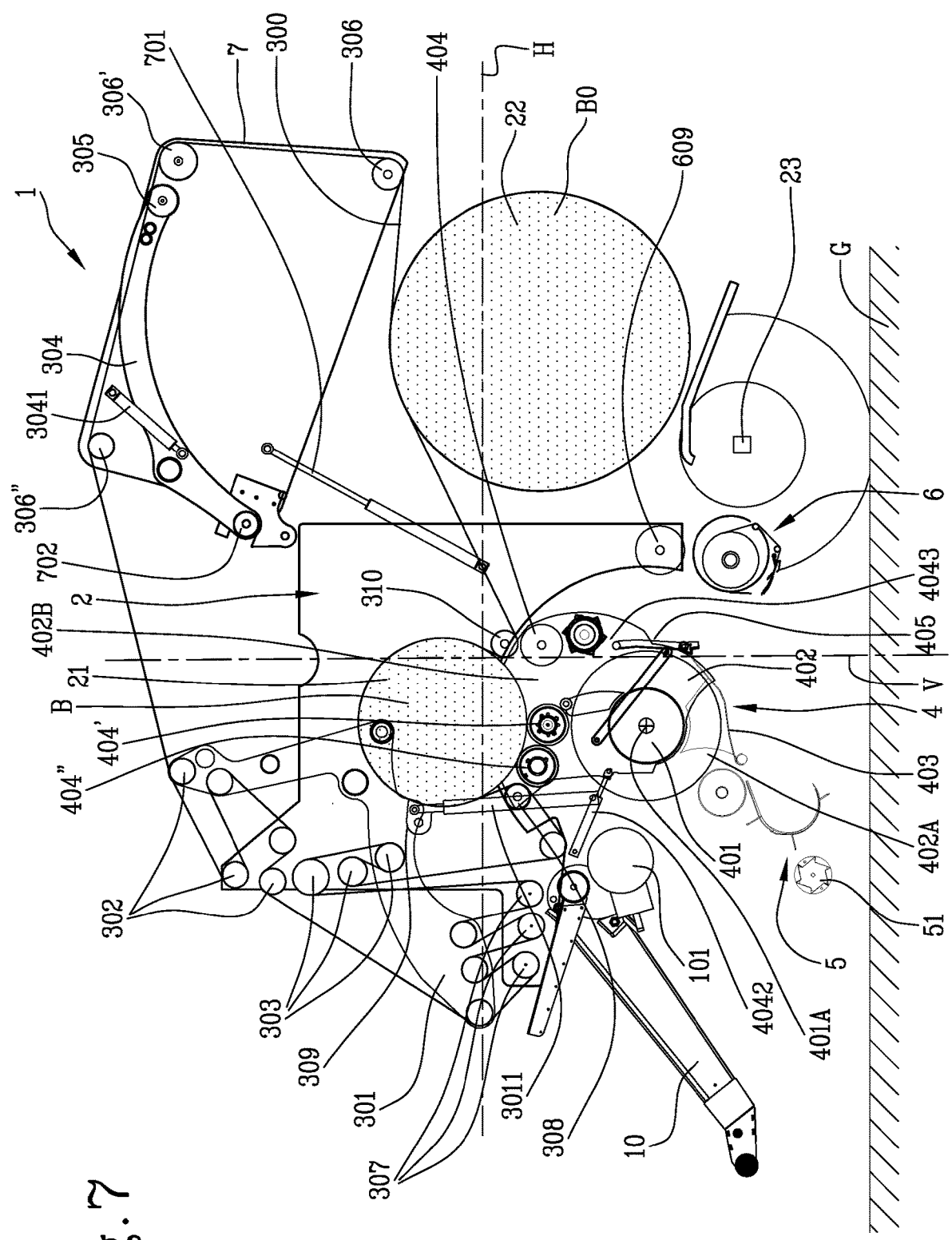
FIG. 7 illustrates the baler of FIG. 1, while continuing to form the bale in the first part of the baling chamber and discharging the former bale.
Figure 8:
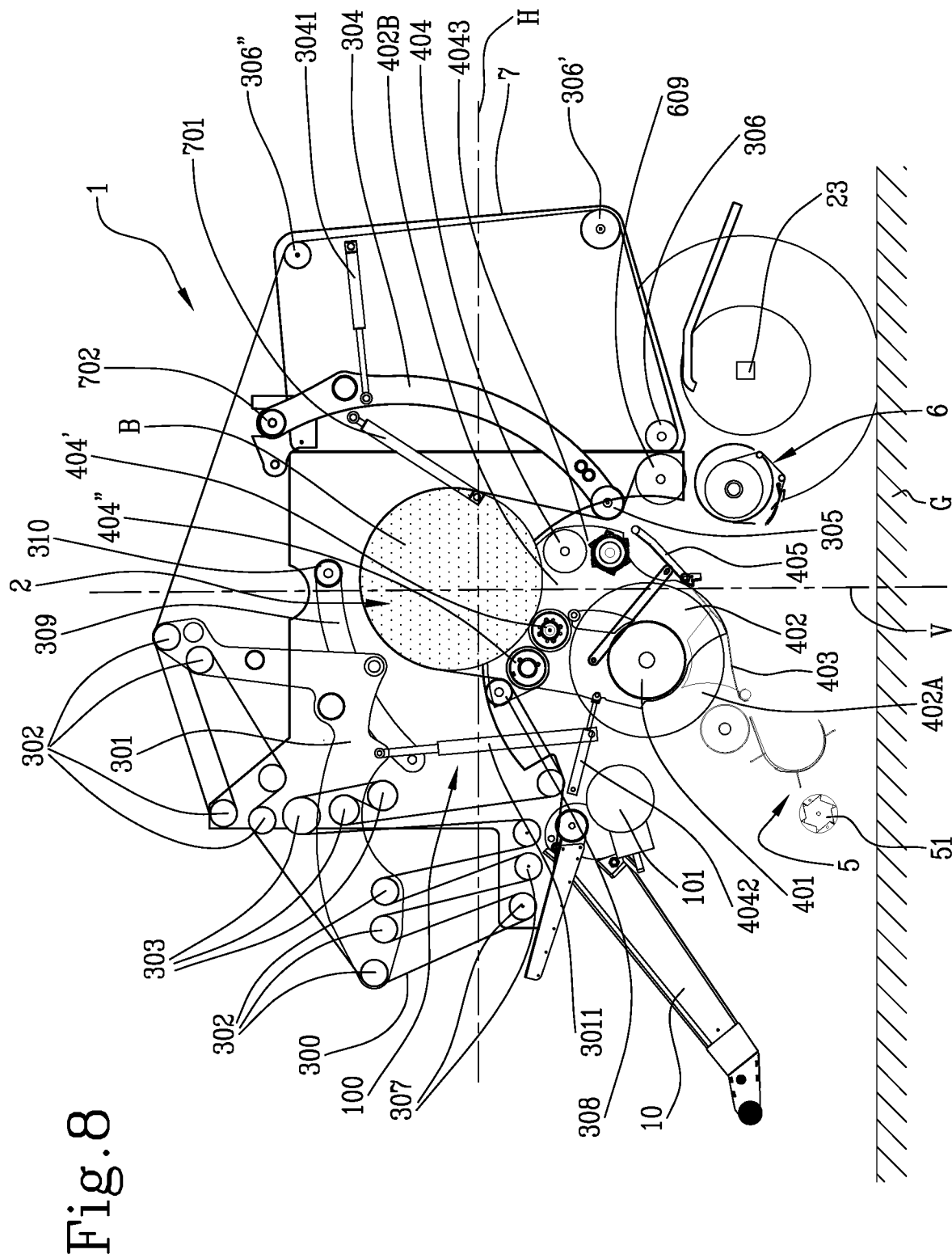
FIG. 8 illustrates the baler of FIG. 1, while transferring the bale from the first part of the baling chamber to the second part of the baling chamber, and simultaneously moving the feeding system from the first configuration to the second configuration.
Figure 9:
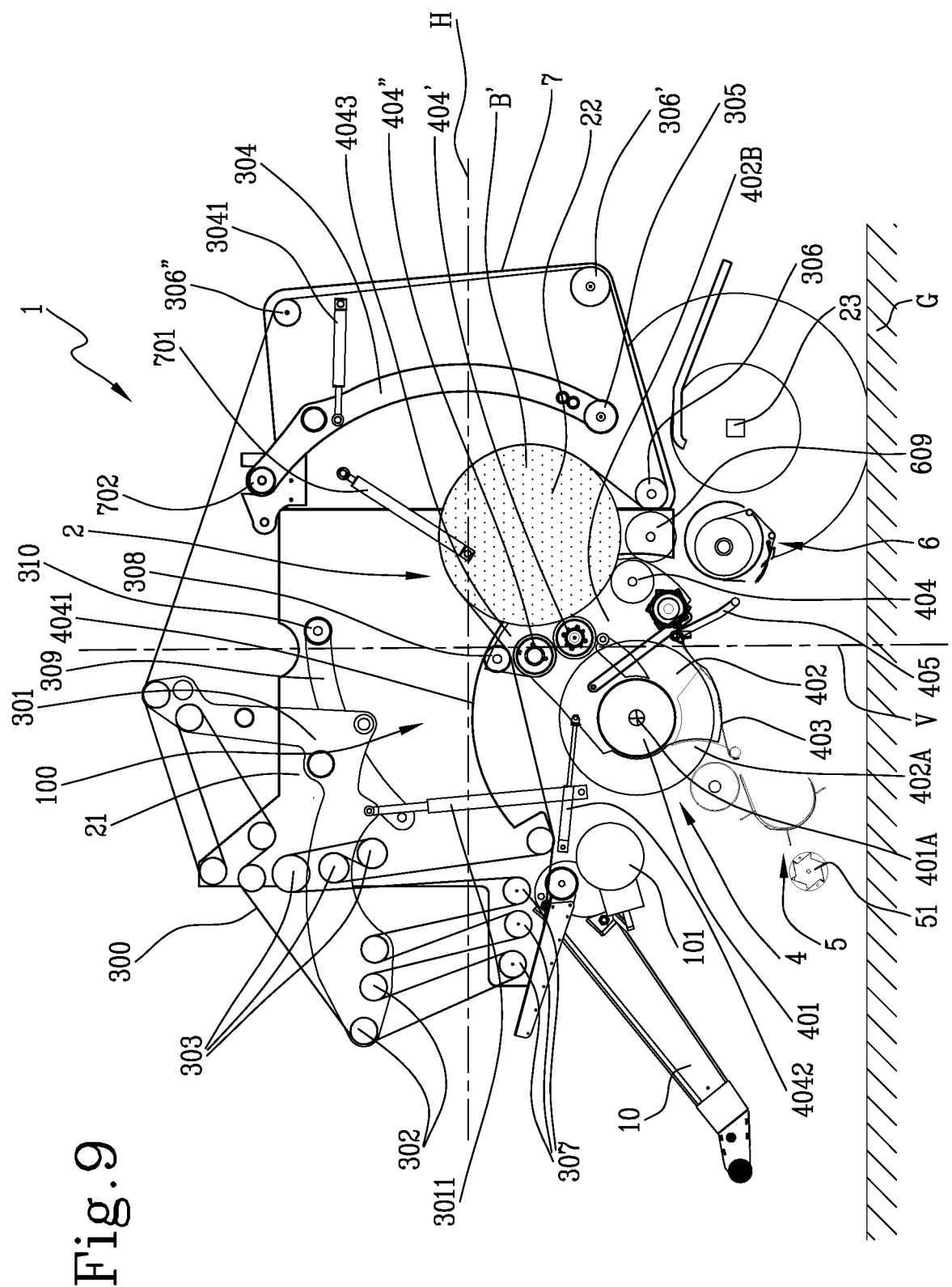
FIG. 9 illustrates the baler of FIG. 1, while continuing forming the bale in the second part of the baling chamber, by the feeding system being in the second configuration.

FIGS. 3, 4, 5, 6 and 7 provides examples of the feeding system 4 being in the first configuration. FIGS. 1, 2 and 9 provides examples of the feeding system 4 being in the second configuration. FIG. 8 provides an example of the feeding system 4 moving from the first configuration to the second configuration.

The conveying assembly 3 is movable together (in synchronized fashion) with the feeding system 4.

In particular, when the feeding system 4 is in its first configuration, the guide arm 309 is in its lowered position; in this position, the guide arm roller 310 stretches the belt 300 around the crops contained in the first part 21. When the feeding system 4 is in its second configuration, the guide arm 309 is in its raised position.

When the feeding system 4 is in its first configuration, or in its second configuration, the rotating arm 304 is in its rest position. When the feeding system 4 is moving from the first configuration to the second configuration, the rotating arm 304 is activated (thus is in its working position), to allow a guided transfer of the crops from the first part to the second part.

The baler 1 comprises a binder 6. The binder 6 is configured to bind a formed bale B with a fastening element 60. The fastening element 60 may be, for example, a net or a plastic film.

The binder 6 includes a fastening element reservoir 600. The fastening element reservoir 600 includes a roll 61 and an amount of fastening element 60, wrapped on the roll 61.

The binder 6 (and/or the fastening element reservoir 600) is positioned under the baling chamber 2; in particular, the binder 6 is positioned under the second part 22 of the baling chamber 2.

The baler 1 lays on a ground surface G. The ground surface G is defined by the field from which the crops are picked up.

The binder 6 is positioned between the ground surface G and the baling chamber 2 (in particular, the second part 22 of the baling chamber 2).

The binder 6 is configured for guiding the fastening element 60 into the baling chamber 2 along an upwardly trajectory. The upwardly trajectory is substantially elongated along a vertical direction V, or has at least a vertical component.

The binder 6 is located between the feeding system 4 and the wheel axle 23, along a horizontal direction H parallel to the ground surface G.

The baler 1 includes a bottom roll 609 connected to the frame 100.

The bottom roll 609 is preferably driven. The bottom roll 609 is configured to receive the fastening element 60 from the binder 6 and to guide it towards the bale B. The bottom roll 609 has a rough surface, in order to grasp the fastening element 60. Preferably, the bottom roll 609 is larger than the bale B, in order to guide the fastening element 60 over the edges of the bale B.

The binder 6 is configured to insert the fastening element into the (second part 22 of) baling chamber 2 through a passage defined between the bottom roll 609 and one of the starter rollers (in particular, the starter roller 404, positioned on a bottom side of the feeding channel 402).

The binder 6 includes a binding structure 601. The binding structure 601 includes a tube surrounding the fastening element reservoir 600.

The binding structure 601 has (or defines) an aperture 601B for releasing the fastening element 60 when it is unrolled from the reservoir 600.

The binder 6 includes a duckbill 602, configured to pull the fastening element 60 out of the aperture 601B and feed it to the baling chamber 2.

The binder 6 includes a linkage bar 604. The linkage bar 604 is pivotable about a pivoting axis 604A. The duckbill 602 is connected to the linkage bar 604. Hence, the linkage bar 604, by pivoting (or rotating) about the pivoting axis 604A, guides the duckbill 602 along a predetermined path towards the baling chamber 2 (or the second part 22 thereof, or towards the bottom roller 609). Said predetermined path of the duckbill 602 towards the baling chamber 2 is directed upwards.

In an embodiment, the linkage bar 604 is arc-shaped. The linkage bar 604 has a first end and a second end, opposite to the first end. The pivoting axis 604A is at the first end of the linkage bar 604. The duckbill 602 is attached to the second end of the linkage bar 604.

Preferably, the binder includes two linkage bars 604, one at a first side of the baler 1 and one at a second side of the baler 1.

The linkage bar 604 includes a linkage bar roller 605 positioned between the first end and the second end. The linkage bar roller 605 is idle. The linkage bar roller 605 is configured to guide the fastening element 60 out of the aperture 601B, towards the duckbill 602.

The binding structure 601 includes a binder guide roller 607. The binder guide roller 607 is idle. The binder guide roller 607 is positioned at the aperture 601B of the binding structure 601. The binder guide roller 607 is configured to guide the fastening element 60 from the reservoir 600 to the linkage bar roller 605.

The binding structure 601 is rotatable about a rotation axis 601A. In an embodiment, the rotation axis 601A is a central axis of the binding structure 601. The rotation axis 601A of the binding structure 601 is spaced apart from the rotation axis 604A of the linkage bar 604. The rotation axis 601A of the binding structure 601 is parallel to the rotation axis 604A of the linkage bar 604.

The binding structure 601 is rotatable between a rest position and a working position, in synchronized fashion with the linkage bar 604.

When the binding structure 601 is in the rest position, the aperture 601B is in a first position and the linkage bar 604 is in a lowered position. When the binding structure 601 is in the working position, the aperture 601B is in a second position, different from the first position, and the linkage bar 604 is in a raised position. When the linkage bar 604 in the raised position, the duckbill 602 extends towards the baling chamber 2.

The binder 6 includes a binder actuator 608. The binder actuator 608 is configured to drive the linkage bar 604 to pivot from the lowered position to the raised position (and vice versa). The binding structure 601 is free to rotate, so that the fastening element 60, pulled out of the aperture 6041B by the duckbill 602 (upon pivoting the linkage bar 604), makes the binding structure 601 rotate. Hence, the binding structure 601 is dragged from the rest position to the working position (and vice versa), by the linkage bar 604 pivoting. The binder actuator 608 is then configured to move both the linkage bar 604 and the binding structure 601.

The binder 6 includes a knife 603. The knife 603 is attached to an external surface of the binding structure 601. The knife 603 is configured to intercept and cut the fastening element 60 in the working position of the binding structure 601. The knife 603, being attached to the binding structure 601, is movable together with the binding structure 601.

The binder 6 includes a braking mechanism 606. The braking mechanism 606 is positioned within the binding structure 601. The braking mechanism 606 includes a roll configured to keep in contact with the reservoir 600 (for example by means of a spring) to control and brake the unrolling of the fastening element 60.

Figure 10:
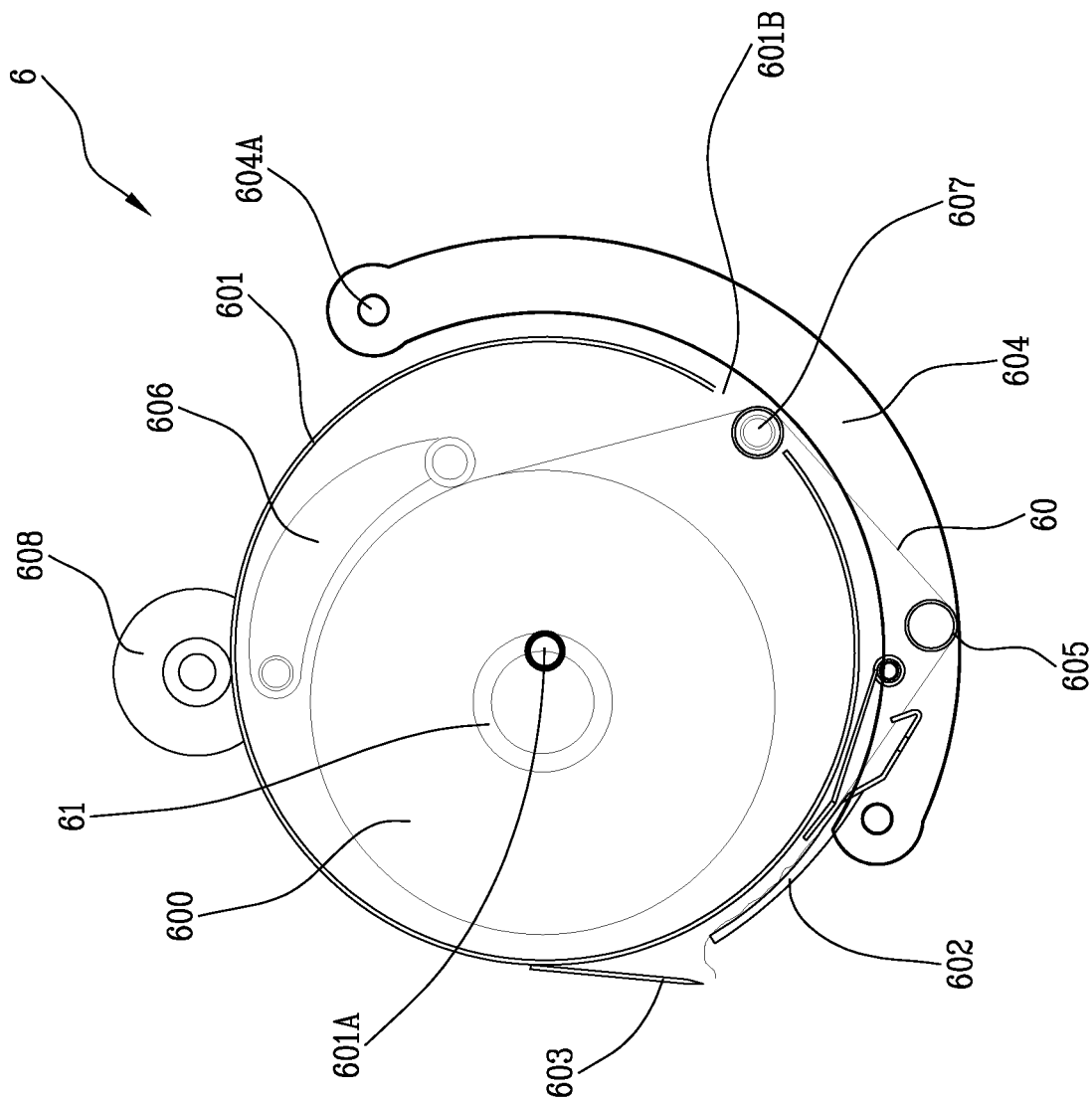
FIG. 10 illustrates a binder of the baler of FIG. 1 in a rest position.
Figure 11:
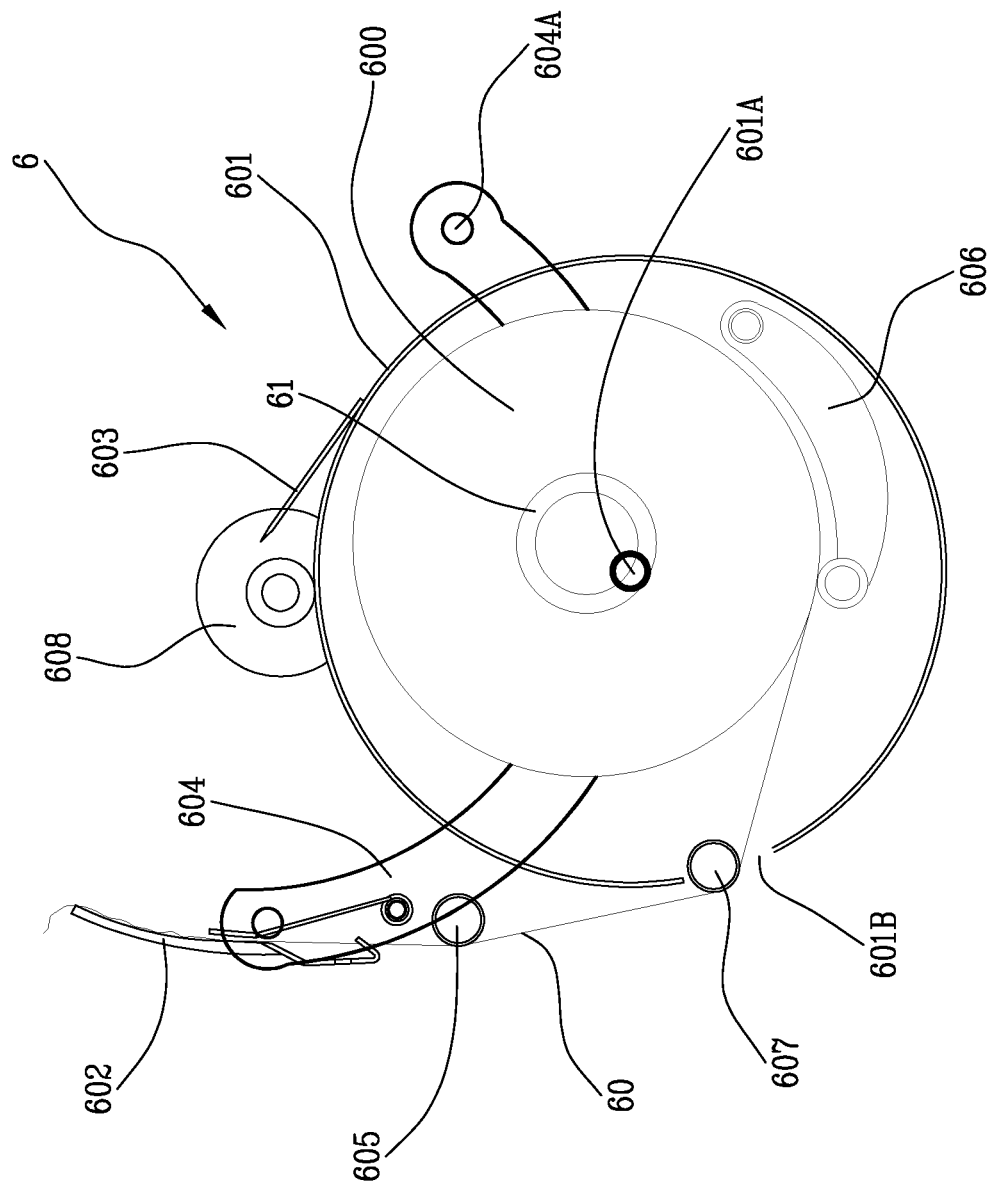
FIG. 11 illustrates the binder of FIG. 8 in a working position.

FIG. 10 illustrates an example of the binding structure 601 in the rest position. FIG. 11 illustrates an example of the binding structure 601 in the working position.

The present disclosure also concerns a method for providing round bales in a baler 1. The method defines a method for operating the baler 1.

The method comprises a step of starting to operate the baler. The step of starting to operate the baler comprises forming a former (first) bale B0; the former bale B0 is entirely formed in the second part 22 of the baling chamber 2 of the baler 1. The second part 22 is located on the rear of the baling chamber 2. During all the period of formatting of the former bale B0, the feeding system 4 is in its second configuration, with the feeding channel 402 in its second orientation, with its outlet 402B opened to the second part 22 of the baling chamber 2. Hence, the former bale B0 is formed by feeding crops from the pick-up device 5 to the second part 22 of the baling chamber 2. During the formation of the former bale B0, the guide arm 309 of the conveying assembly 3 is in its raised position, in which it does not stretch the belt 300. Also, the rotating arm 304 is in its rest position, extending along a rear wall of the tailgate 7.

When the bale B0 has reached its final dimension, the feeding system 4 is switched to its first configuration, in which the feeding channel 402 is in its first orientation, with its outlet 402B opened to the first part 21 of the baling chamber 2. The feeding system 4 is moved from the second configuration to the first configuration by rotating the starter rollers structure 4043, by means of the actuator 4042. Specifically, from a lateral point of view on a left-hand side of the baler (with the tongue 10 connectable to the tractor on the left and the tailgate 7 on the right), the starter rollers structure 4043 rotates in an anticlockwise direction.

Simultaneously with the rotation of the starter rollers structure 4043, the guide arm 309 is moved to its lowered position, by means of the guide arm actuator 3011. So, the guide arm roller 310 pushed against the belt 300.

So, the method comprises a step of starting to form a (second) bale B in the first part 21 of the baling chamber 2. In fact, the feeding system 4 in the first configuration feeds the crops to the first part 21 to the baling chamber 2.

The method includes a step of binding the former bale B0. The method includes a step of discharging the former bale B0.

While the bale B starts to be formed in the first part 21 of the baling chamber 2, the former bale B0, housed in the second part 22, is bound with the fastening element 60. After the fastening element 60 has been applied, the bale B0 is discharged, by opening the tailgate 7.

When the bale B has reached a predetermined dimension (smaller than its final dimension), the method comprises a step of transferring the bale B from the first part 21 to the second part 22 of the baling chamber 2. Simultaneously with the transfer of the bale B, the feeding system 4 is moved from the first configuration to the second configuration. During the transferring, the feeding channel continuously varies its orientation from the first orientation to the second orientation.

The feeding system 4 is moved from the first configuration to the second configuration by rotating the starter rollers structure 4043, by means of the actuator 4042. Specifically, from a lateral point of view on a left-hand side of the baler (with the tongue 10 connectable to the tractor on the left and the tailgate 7 on the right), the starter rollers structure 4043 rotates in a clockwise direction. Hence, during the transfer of the bale B, the outlet 402B of the feeding channel 402 and the starter rollers 404, 404' remain in contact with the bale B. So, the crops are continuously fed to the bale B while it is moved to the second part 22 of the baling chamber 2. During the transfer of the bale B, the rotating arm 304 is positioned (by means of the actuator 3041) in its working position, to stretch the belt 300 around the bale B. Also, during the transfer of the bale B, the guide arm 309 is put in its raised position to allow the bale B passing to the second part 22 of the baling chamber 2.

Then, the method comprises a step of completing the formation of the bale B in the second part 22 of the baling chamber 2.

After the bale B has reached its final dimension, the feeding system 4 is moved back to the second configuration, to start to form a new (third) bale in the first part 21 of the baling chamber 2.

The method includes a step of binding the bale B. The method includes a step of discharging the bale B.

While forming the new (third) bale in the first part 21 of the baling chamber 2, the bale B is bound with the fastening element 60 and, then, discharged.

The step of binding includes guiding a fastening element 60 into the baling chamber along an upwardly trajectory (having at least a vertical component).

The step of binding includes rotating a linkage bar 604 connected to a duckbill 602 along an upwardly trajectory, from a lowered position to a raised position. In the raised position, the duckbill 602 feeds the fastening element 60 to the baling chamber (or to the bottom roller 609). The step of binding includes rotating a binding structure 601 from a rest position to a working position. The rotation of the linkage bar 604 is performed by an actuator 608. The rotation of the binding structure 601 is synchronized with the rotation of the linkage bar 604. In an embodiment, the duckbill 602 upon rotating the linkage bar 604 stretches the fastening element 60 so to unroll the fastening element 60 from the reservoir 600 and to make the binding structure 601 rotate.

In the step of binding (or at the start thereof), from a point of view on a left-hand side of the baler (with the tongue 10 connectable to the tractor on the left and the tailgate 7 on the right), the linkage bar 604 rotates in an anticlockwise direction, from the lowered position to the raised position. Also, the binding structure 601 rotates in an anticlockwise direction, from the rest position to the working position.

During the step of binding, the linkage bar 604 remains in its raised position and the binding structure 601 remains in its working position. During the step of binding, the rotation of the bottom roller 609, combined with the rotation of the bale B which is being wrapped, makes the fastening element 60 unroll from the reservoir 600.

After the binding of the bale has been completed, the method includes a step of return. In the step of return, the actuator 608 makes the linkage bar 604 return from the raised position to the lowered position. Simultaneously, the binding structure 601 returns from the working position to the rest position.

In the step of return, from a point of view on a left-hand side of the baler (with the tongue 10 connectable to the tractor on the left and the tailgate 7 on the right), the linkage bar 604 rotates in a clockwise direction, from the lowered position to the raised position. Also, the binding structure 601 rotates in a clockwise direction, from the rest position to the working position.

According to a further aspect, the present disclosure provides a self-propelled (e.g. autonomous-drive) baler comprising:
  a frame 100, including a baling chamber 2 for receiving crops for forming a bale, the baling chamber 2 including a first part 21, for housing a first amount of crops, and a second part 22, for housing a second amount of crops;
  a conveying assembly 3, configured for imparting a first rotating movement to the first amount of crops, and, at the same time, a second rotating movement to the second amount of crops;
  a pick-up device 5, configured for picking-up the crops from a field;
  a feeding system 4, including a feeding channel 402 having an inlet, for receiving the crops from the pick-up device 5, and an outlet 402B, opened to the baling chamber 2 for feeding the crops to the baling chamber 2, wherein the feeding system 4 is movable between a first configuration and a second configuration, wherein, in the first configuration of the feeding system 4, the feeding channel 402 has a first orientation so that the outlet 402B of the feeding channel 402 is opened to the first part 21 of the baling chamber 2, and, in the second configuration of the feeding system 4, the feeding channel 402 has a second orientation different from the first orientation, so that the outlet 402B of the feeding channel 402 is opened to the second part 22 of the baling chamber 2.

The invention claimed is:

1. A baler for providing round bales, comprising:
a frame, including a baling chamber for receiving crops for forming a bale, the baling chamber including a first part, for housing a first amount of crops, and a second part, for housing a second amount of crops;
a conveying assembly, configured for imparting a first rotating movement to the first amount of crops, and, at the same time, a second rotating movement to the second amount of crops;
a pick-up device, configured for picking-up the crops from a field;
a feeding system, including a feeding channel having an inlet, for receiving the crops from the pick-up device, and an outlet, opened to the baling chamber for feeding the crops to the baling chamber,
wherein the feeding system is movable between a first configuration and a second configuration, wherein, in the first configuration of the feeding system, the feeding channel has a first orientation so that the outlet of the feeding channel is opened to the first part of the baling chamber, and, in the second configuration of the feeding system, the feeding channel has a second orientation different from the first orientation, so that the outlet of the feeding channel is opened to the second part of the baling chamber,
wherein the feeding system further includes a plurality of starter rollers, arranged at the outlet of the feeding channel, and configured to cooperate with the conveying assembly to rotate the first amount of crops and the second amount of crops, and with the feeding channel to feed the crops into the baling chamber, the starter rollers of said plurality being movable in synchronized fashion with the feeding channel, between a first position, in which they at least partially delimit the first part of the baling chamber to rotate the first amount of crops, and a second position, in which they at least partially delimit the second part of the baling chamber, to rotate the second amount of crops, wherein, in the first configuration of the feeding system, the starter rollers of said plurality are in the first position, and, in the second configuration of the feeding system, the starter rollers of said plurality are in the second position.

2. The baler of claim 1, wherein the outlet of the feeding channel defines in the baling chamber an opening through which the crops are fed to the baling chamber, wherein the starter rollers of said plurality delimit said opening.

3. The baler of claim 2, wherein the conveying assembly is configured to transfer the first amount of crops from the first part of the baling chamber to the second part of the baling chamber.

4. The baler of claim 3, wherein the plurality of starter rollers is configured to keep in contact with the first amount of crops while the conveying assembly transfers the first amount of crops from the first part of the baling chamber to the second part of the baling chamber.

5. The baler of claim 4, wherein the feeding channel is configured to continuously feed the crops to the baling chamber while the conveying assembly transfers the first amount of crops from the first part of the baling chamber to the second part of the baling chamber.

6. The baler of claim 1, wherein the conveying assembly includes:
a belt, partially delimiting both the first part and the second part of the baling chamber;
a plurality of belt rollers, supporting and rotating the belt, wherein, in the first configuration of the feeding system, the starter rollers cooperate with the belt to delimit the first part of the baling chamber, and, in the second configuration of the feeding system, the starter rollers cooperate with the belt to delimit the second part of the baling chamber.

7. The baler of claim 6, wherein the conveying assembly includes one or more arms, wherein at least some belt rollers of said plurality of belt rollers are movable, in synchronized fashion with the feeding system, through said one or more arms, to move the belt.

8. The baler of claim 1, wherein the second part of the baling chamber is provided in a rear area of the baling chamber and the first part of the baling chamber is provided in a front area of the baling chamber, wherein the front area is interposed between the tractor and the rear area.

9. The baler of claim 1, wherein the feeding system includes a starter rollers structure supporting the starter rollers and rotatable about a respective rotation axis to move the starter rollers between the first position and the second position.

10. The baler of claim 9, wherein the feeding system includes a pushing rotor configured to advance the crops along the feeding channel and rotatable about a respective rotation axis, wherein the rotation axis of the starter rollers structure is superposed with the rotation axis of the pushing rotor.

11. The baler of claim 1, comprising:
a binding unit configured to bind the bale with a fastening element;
a bottom roller fixed to the frame,
wherein the binding unit is configured to feed the fastening element to the second part of the baling chamber through a passage defined between a starter roller of said plurality of starter rollers and the bottom roller.

12. The baler of claim 1, wherein the baler is connectable to a tractor.

13. A method for producing round bales in a baler, the method comprising the following steps:
picking-up crops from a field, through a pick-up device;
start a formation of a bale in a first part of the baling chamber, by advancing the crops along a feeding channel, from an inlet of the feeding channel facing the pick-up device to an outlet of the feeding channel, the feeding channel having a first orientation so that the outlet being opened to the first part of the baling chamber, and by rotating the crops received in the first part of the baling chamber through a conveying assembly and through a plurality of starter rollers, arranged at the outlet of the feeding channel;
while starting to form the bale in the first part of the baling chamber, binding and discharging a former bale, housed in a second part of the baling chamber;
after the former bale has been discharged from the second part of the baling chamber, transferring the bale from the first part to the second part of the baling chamber, wherein, during the transferring of the bale from the first part to the second part of the baling chamber, the feeding channel and the starter rollers move in synchronized fashion until the feeding channel has a second orientation in which the outlet is opened to the second part of the baling chamber;
completing the formation of the bale in the second part of the baling chamber, by advancing the crops along the feeding channel, from the inlet to the outlet of the feeding channel, the outlet being opened to the second part of the baling chamber, and by rotating the crops received in the second part of the baling chamber through the conveying assembly and through the plurality of starter rollers.

14. The method of claim 13, wherein during the transferring of the bale from the first part to the second part of the baling chamber, the outlet of the channel and the starter rollers keep in contact with the bale.

15. The method of claim 13, wherein during the transferring of the bale from the first part to the second part of the baling chamber, the feeding channel continuously feeds the crops to the bale while the conveying assembly transfers the bale from the first part of the baling chamber to the second part of the baling chamber.

16. The method of claim 13, wherein after the bale is completely formed in the second part of the baling chamber, the feeding channel is moved back to its first orientation to start to form a new bale in the first part of the baling chamber, while the bale housed in the second part of the baling chamber is bound with a fastening element.

17. The method of claim 13, wherein the baler is connected to a tractor.

18. A self-propelled baler for providing round bales, comprising:
a frame, including a baling chamber for receiving crops for forming a bale, the baling chamber including a first part, for housing a first amount of crops, and a second part, for housing a second amount of crops;
a conveying assembly, configured for imparting a first rotating movement to the first amount of crops, and, at the same time, a second rotating movement to the second amount of crops;
a pick-up device, configured for picking-up the crops from a field;
a feeding system, including a feeding channel having an inlet, for receiving the crops from the pick-up device, and an outlet, opened to the baling chamber for feeding the crops to the baling chamber,
wherein the feeding system is movable between a first configuration and a second configuration, wherein, in the first configuration of the feeding system, the feeding channel has a first orientation so that the outlet of the feeding channel is opened to the first part of the baling chamber, and, in the second configuration of the feeding system, the feeding channel has a second orientation different from the first orientation, so that the outlet of the feeding channel is opened to the second part of the baling chamber.

19. The self-propelled baler of claim 18, comprising a system of autonomous driving.

20. The self-propelled baler of claim 18, wherein the feeding system further includes a plurality of starter rollers, arranged at the outlet of the feeding channel, and configured to cooperate with the conveying assembly to rotate the first amount of crops and the second amount of crops, and with the feeding channel to feed the crops into the baling chamber, the starter rollers of said plurality being movable in synchronized fashion with the feeding channel, between a first position, in which they at least partially delimit the first part of the baling chamber to rotate the first amount of crops, and a second position, in which they at least partially delimit the second part of the baling chamber, to rotate the second amount of crops, wherein, in the first configuration of the feeding system, the starter rollers of said plurality are in the first position, and, in the second configuration of the feeding system, the starter rollers of said plurality are in the second position.

\* \* \* \* \*